United States Patent [19]
Johansson

[11] Patent Number: 5,009,011
[45] Date of Patent: Apr. 23, 1991

[54] ANNULAR SAW BLADE AND ANNULAR SAW WITH DRIVING MEANS FOR A SAW BLADE

[75] Inventor: Mats Johansson, Forshaga, Sweden
[73] Assignee: Diaglobe Aktiebolag, Forshaga, Sweden
[21] Appl. No.: 531,401
[22] Filed: Jun. 4, 1990

[30] Foreign Application Priority Data
Jun. 2, 1989 [SE] Sweden ................................ 8902009

[51] Int. Cl.⁵ .............................................. B27B 5/14
[52] U.S. Cl. ........................................ 30/389; 30/347; 51/168
[58] Field of Search .......................... 30/347, 388, 389; 51/73 R, 168; 83/676

[56] References Cited
U.S. PATENT DOCUMENTS

| | | |
|---|---|---|
| 2,690,774 | 10/1934 | Hoard . |
| 4,026,177 | 11/1977 | Lokey . |
| 4,316,328 | 2/1982 | Duggan et al. ........... 30/389 |
| 4,793,065 | 12/1988 | Johansson .............. 30/389 |
| 4,800,650 | 1/1989 | Johansson .............. 30/389 |

FOREIGN PATENT DOCUMENTS

| | | |
|---|---|---|
| 70233 | 3/1929 | Sweden . |
| 425636 | 3/1982 | Sweden . |
| 460028 | 5/1986 | Sweden . |
| 695813 | 11/1979 | U.S.S.R. . |
| 958085 | 9/1982 | U.S.S.R. . |

Primary Examiner—Douglas D. Watts
Attorney, Agent, or Firm—Nixon & Vanderhye

[57] ABSTRACT

An annular saw blade has a outer periphery with cutting or tearing members (15), an inner periphery or inner edge and an annular web portion (16) between the inner and outer peripheries. The saw blade (8) has at least one annular drive surface of a flexible, polymeric solid material (14), against which flexible drive surface a rotatable drive member (13) is intended to be pressed to effect the rotation of the saw blade about its center of rotation. An annular saw for this saw blade has at least one rotatable drive member (30) with projections (37) intended to be pressed into said flexible material of the saw blade.

7 Claims, 7 Drawing Sheets

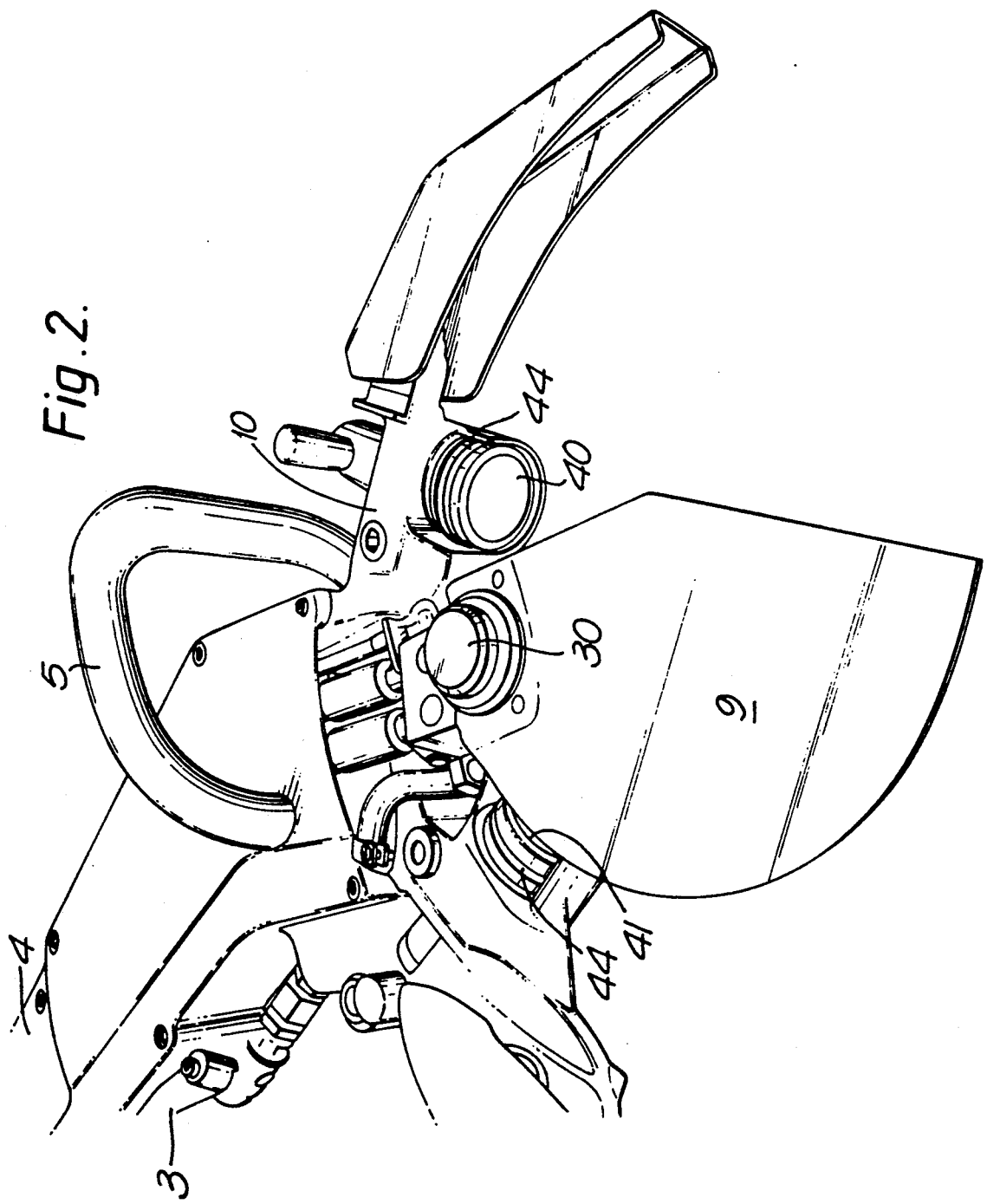

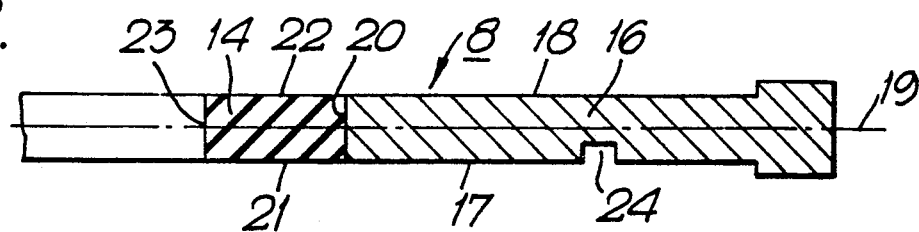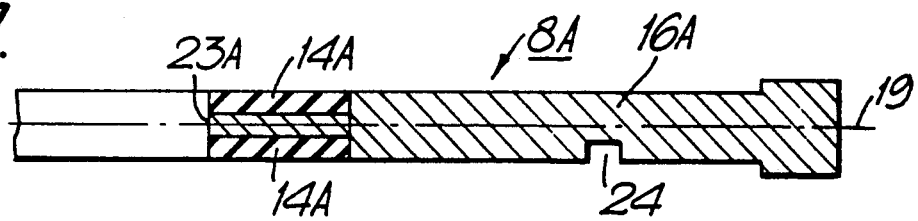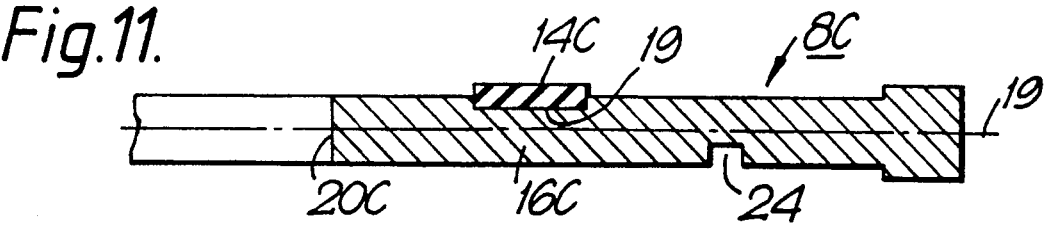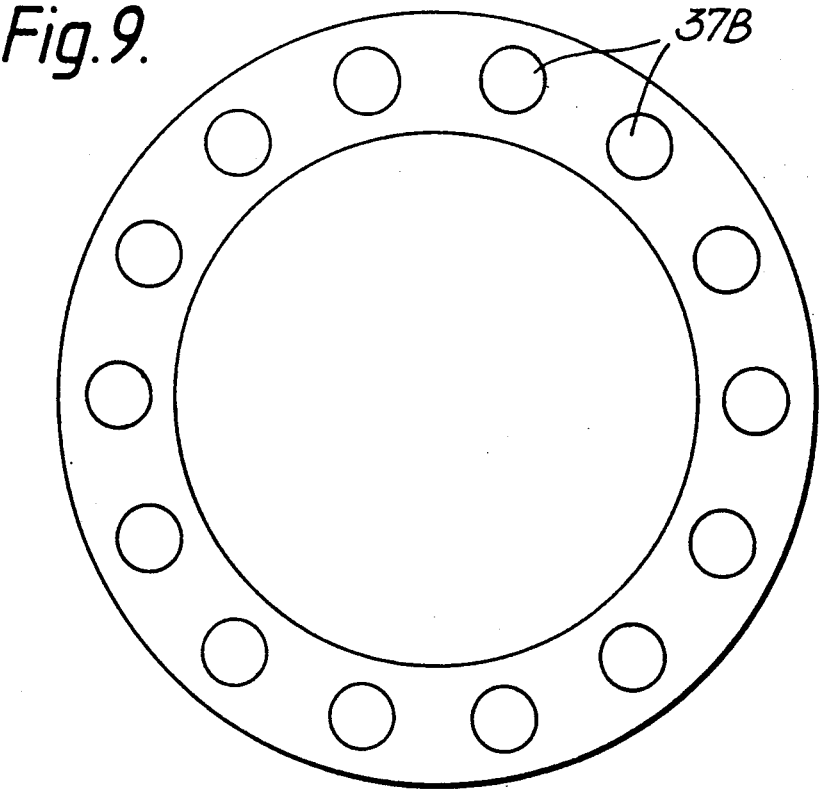

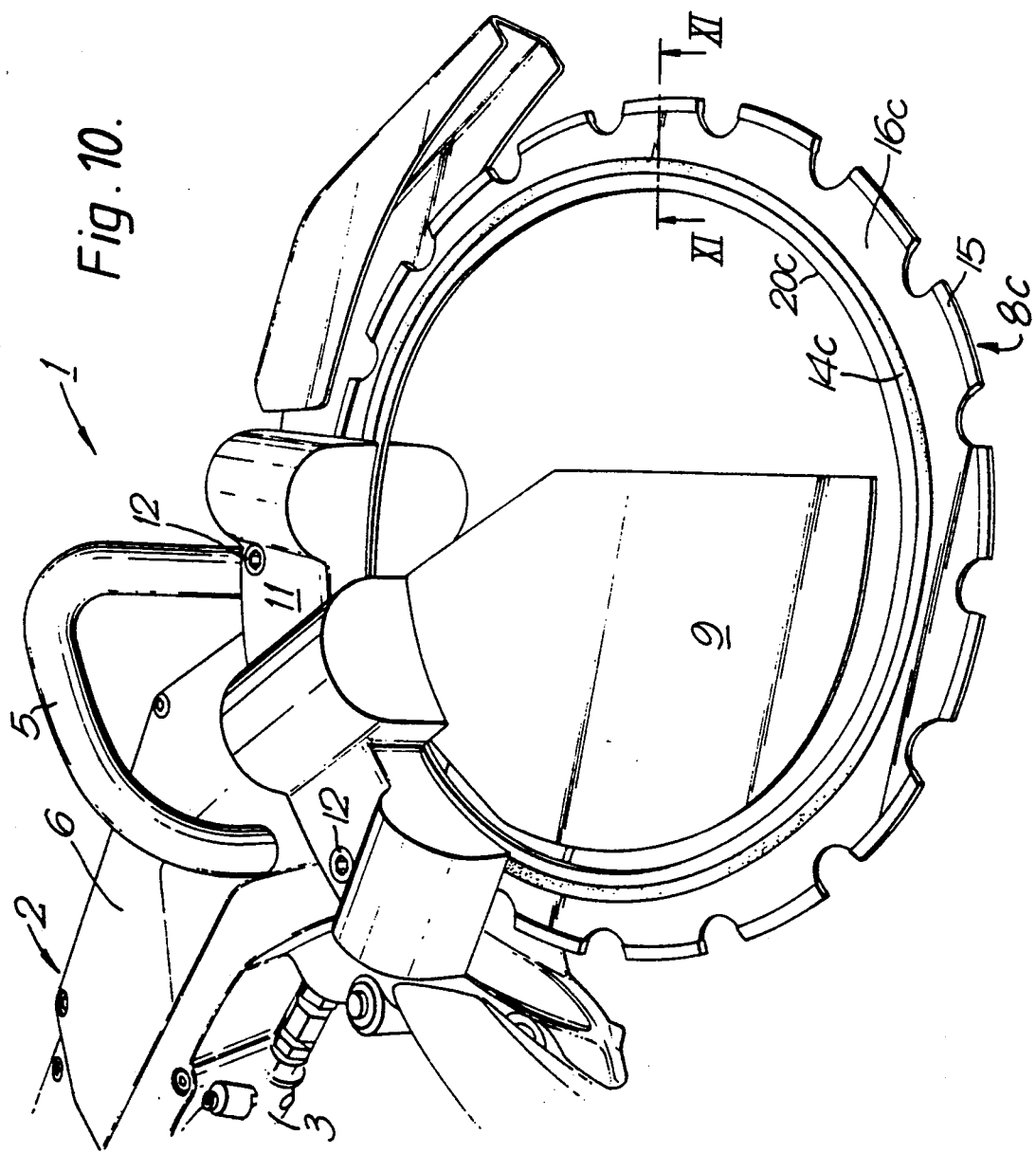

ANNULAR SAW BLADE AND ANNULAR SAW WITH DRIVING MEANS FOR A SAW BLADE

TECHNICAL FIELD

The present invention relates to an annular saw blade with an outer periphery which is provided with cutting or tearing members, an inner periphery or inner edge and an annular web portion between the inner and outer peripheries. The invention also relates to an annular saw with driving means for driving the saw.

BACKGROUND OF THE INVENTION

Annular saws have long been known but have not until recently been used to any great extent. The reason for this is that the driving of the saw blades has created a problem which has been difficult to solve. For the rotation of saw blades in annular saws, either a gear-wheel drive or a friction drive is used. Gear-wheel drive systems are described, for example, in the U.S. Pat. Nos. 2,804,105, 2,972,363, 3,373,489, and 3,808,685. The major advantage of the gear-wheel drive is that it does not give rise to considerable losses of energy due to friction, so that the drive power of the saw may be used more efficiently for the sawing work. A notable disadvantage, however, is that the wear between the gear-wheel and the annular saw blade is very great, particularly when sawing concrete, metal and other heavy wear materials, since it is impossible to prevent saw dust from getting between the gear-wheel and the saw blade. Due to the wear, the saw blade is gradually displaced in the radial direction. As a result, the gear pitch of the saw blade changes so that it does not match the pitch of the driving gear-wheel. This tendency after a comparatively short period of time will cause a sudden disintegration of the saw blade. This is a problem not only as far as cost is concerned but also because it means that the risk of accidents is significantly increased.

Friction-based transmissions for annular saw blades are described, for example, in the U.S. Pat. Nos. 3,221,783, 3,438,410, 3,930,310, and Re-27,716. Typically, these systems use one or more drive wheels which bear against one side of the web of the saw blade with opposite support from an opposing wheel bearing against the other side of the saw blade. In order to obtain sufficiently good friction between the drive wheel and the saw blade, it generally necessary to apply a high pressure between the drive wheel and the saw blade. As a result, heat is generated to such a high degree that the blade may be deformed, which can cause sudden disintegration of the blade. Moreover, the bearings of the drive wheels may be damaged by the high pressure. In order to improve the friction and hence the driving it has been suggested to deposit a wear layer on the drive wheel. This, however, has not solved the problem. The inventions described in U.S. Pat. Nos. 4,472,880 and 4,793,065 constituted major achievements within this technical field and brought about a significant break through for the annular saw. According to these inventions, which are based on the principle of friction drive, the driving force is applied to the inner rim portion of the annular saw blade which is designed as a wedge. Although these inventions were major technical achievements they do not however provide a solution to the driving problem which is free of disadvantages. For example, much poser is lost because of high pressure and great friction between the drive wheel and the saw blade.

Another problem which concerns all types of annular saws is that they give rise to an uncomfortably high noise level. While a conventional circular saw blade is kept firmly clamped on a driving shaft, an annular saw is rotated between one or more drive rollers and a plurality of support rollers. All these rollers together generate rattle and vibrations which cause a higher noise level than is experienced with conventional circular saws.

BRIEF DESCRIPTION OF THE INVENTION

The present invention provides an annular saw blade which is designed so that, when it is used in combination with an annular saw having suitably designed driving means, it will provide a drive substantially without slippage and with low power losses as a result of friction. Thus, the present invention combines the advantages of the gear wheel drive and the friction drive, which at the same time substantially avoids the drawbacks of those two systems. According to one embodiment, there is provided a saw blade with at least one annular driving surface of a flexible, solid polymeric material, preferably rubber, against which flexible driving surface a rotatable driving means is intended to be pressed to effect rotation of the saw blade about its center of rotation. The rotatable driving means is suitably provided with cogs, ridges, or other projections, which in principle provide a driving force having the same efficiency as a gear-wheel transmission. At the same time the resonance in the saw blade is significantly damped by means of the flexible material defining the driving surface, so that a remarkable attenuation of sound is achieved.

The flexible material, preferably rubber, may for example be located at the inner rim portion of the saw blade in order to permit the inner rim portion to cooperate with a drive wheel or a drive pulley provided inside the inner rim portion of the saw blade. In such an arrangement it is possible to use a drive means having the features shown in the above-mentioned U.S. Pat. No. 4,793,065. The only modification of the drive means which may have to be made is to replace the drive pulley with a drive pulley which has been provided with cogs or other projections in the wedge shaped groove of the drive pulley. As an alternative, the flexible material may be located on the web portion of the saw blade, suitably in a recess in the web portion. In this case there may be used a drive means such as that shown in the above-mentioned U.S.-Re-27,716, with the even drive wheel being replaced by a gear-wheel or by a wheel which has been provided with other projections around its periphery so that a secure grip with the flexible material is obtained with essentially the same character as a gear-wheel transmission.

Further characteristic features, aspects and advantages of the invention will be apparent from the appending claims and from the following description of some conceivable embodiments.

BRIEF DESCRIPTION OF DRAWINGS

Preferred embodiments of the invention reference will now be described with reference to the accompanying drawings, in which FIG. 1 constitutes a perspective view of an annular saw according to a first embodiment of the invention, FIG. 2 shows the machine unit according to FIG. 1 with the saw blade and certain holding devices removed, FIG. 3 shows a section III—III through the saw blade in FIG. 1, FIG. 7 is a cross-section through the saw blade according to a second embodiment of the saw blade, FIG. 9 shows a cross-section through the drive pulley according to a second embodiment of the drive pulley in the same view as FIG. 5, FIG. 10 is a perspective view of an annular saw with an annular saw blade according to a further embodiment of the invention, FIG. 11 is a section XI—XI in FIG. 10 through the annular saw blade according to the further embodiment.

DESCRIPTION OF PREFERRED EMBODIMENTS

Figure 1:
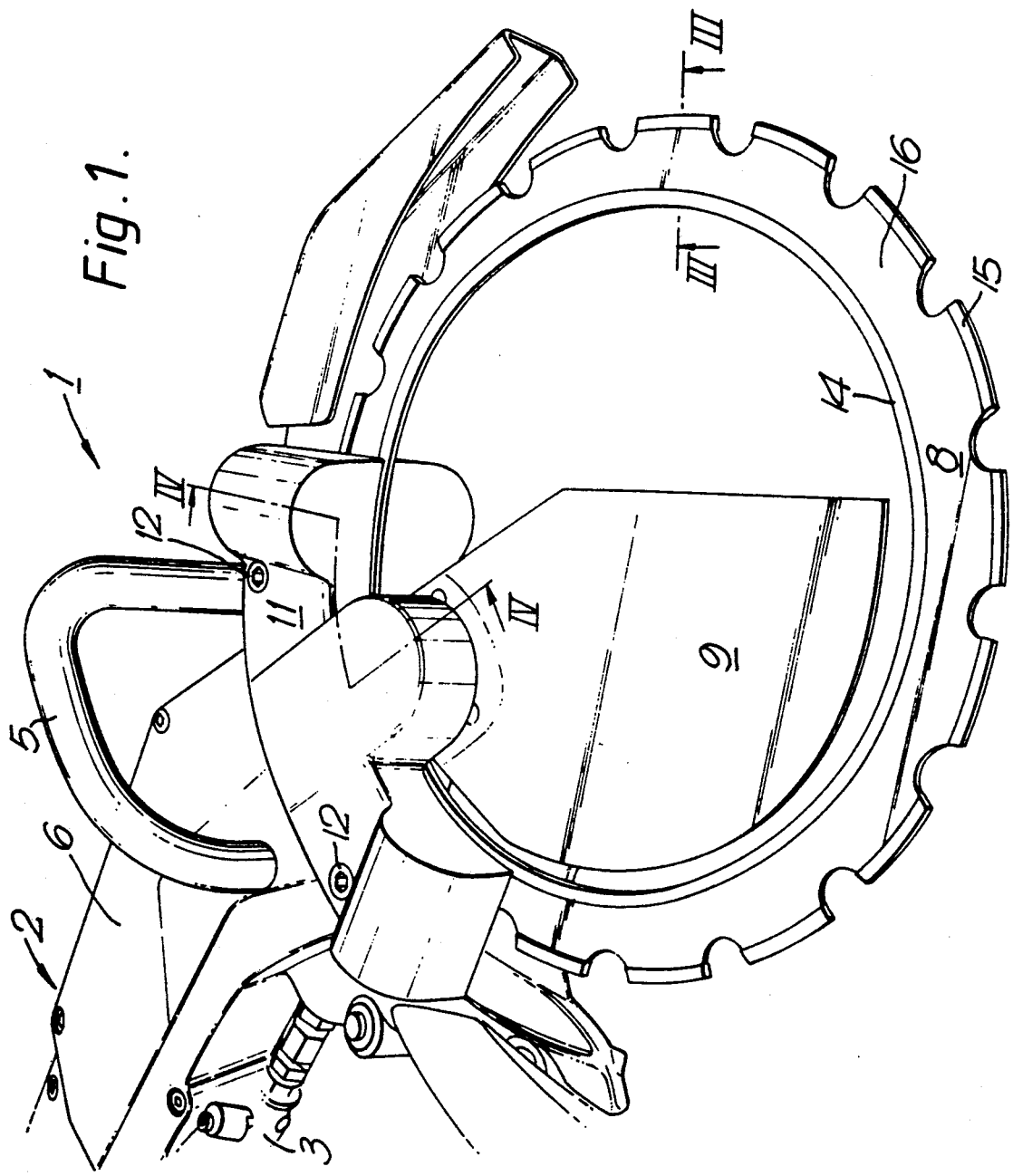

Referring first to FIGS. 1-6, a machine unit of a hydraulically driven annular saw 1 is generally designated 2. The machine unit 2 comprises a motor housing 6 with a hydraulic motor (not shown). The motor is provided with hydraulic conduits 3 and handles 4 and 5. The machine unit 2 also includes elements for holding an annular saw blade 8 in place in the machine unit and a transmission system for transmitting drive power of the motor to the saw blade 8. The machine unit 2 has a center disc 9 and a base plate 10. A cover 11 is mounted on the base plate 10 by means of screws 12, so that the cover 11 with the support elements for the saw blade 8 fitted in it can be removed when the saw blade 8 is to be fitted or replaced.

The annular saw blade 8 has an inner rim portion 14 of rubber, an outer rim portion 15 provided with cutting elements in the shape of diamond tipped sectors, and a web portion 16 between the rim portions with a smooth underside 17 and a smooth topside 18. The sides 17 and 18 are parallel to each other and to a plane of symmetry 19 of the saw blade 8 (FIG. 3).

The inner rim portion 14 of rubber is secured through vulcanization to the inner edge of the web portion 16 of the saw blade which consists of steel. The rubber portion 14 is completely straight according to this embodiment and has a thickness equal to that of the web portion 16 of the saw blade. Also the inner edge of the rubber portion 14 is completely straight. A groove 24 is provided in the smooth underside 17 of the saw blade 8.

Figure 4:
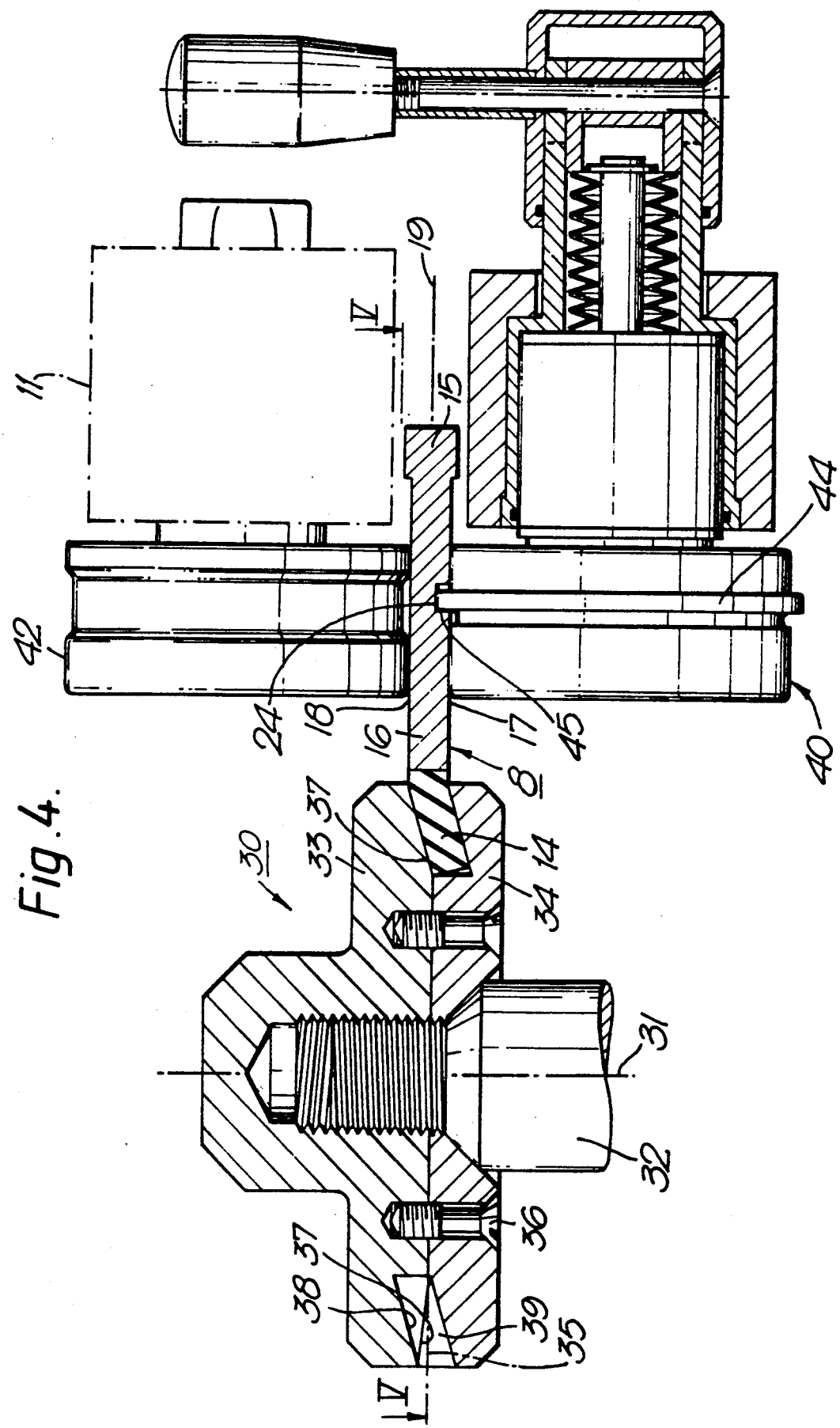
FIG. 4 is a section IV—IV in FIG. 1 through the drive pulley and the saw blade and shows also, partly schematically, certain holding means of a kind known per se, while other parts have been omitted for clarity.
Figure 5:
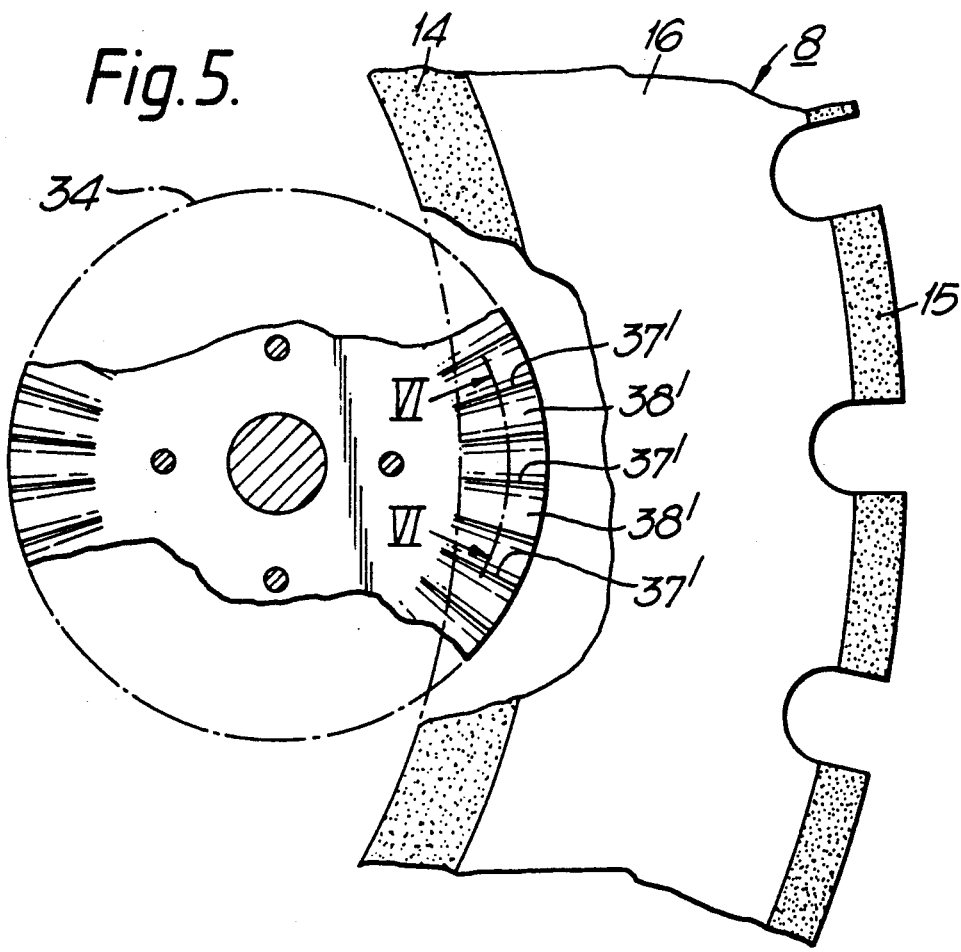
FIG. 5 is a view V—V in FIG. 4, the saw blade being shown only through dashed lines and other parts being omitted for clarity.

A drive pulley 30 of the saw blade 8 is fitted mainly inside the annulus of the saw blade 8. The pulley 30 is arranged so as to be able to rotate around an axis of rotation 31, which is parallel to the axis of rotation of the saw blade 8, via a drive axle 32 (FIG. 4). Further, transmission means (not shown) are provided for transmitting drive power of the motor to the drive pulley 30, together with a pair of lower running rollers 40 and 41 and a pair of upper running rollers 42 and 43 in the cover 11 (roller 43 is not shown). Each one of the lower running rollers 40 and 41 is provided with a flange 44 in a manner known per se. The flange 44 is accommodated in known manner in the groove 24 having an edge 45. As far as other elements shown in FIGS. 1, 2 and 4 are concerned, reference is made to U.S. Pat. No. 4,793,065 incorporated herein by reference.

According to the preferred embodiment, the inner rim portion 14 of the saw blade 8 consists of rubber united with the inner edge 20 of the web portion 16 of the metal saw blade 8 through vulcanization. The rim portion 14 has the same thickness as the web portion 16 of the saw blade 8. The relative thickness is somewhat exaggerated in the drawings. The sides 21 and 22 of the rim portion 14 are parallel with and lie in the same planes as the sides 17 and 18 of the web portion 16. The inner edge 23 of the rubber portion 14 according to this embodiment is straight but could also be somewhat rounded.

The drive pulley according to this embodiment consists of two halves 33 and 34, which abut each other in a dividing plane 35 and are clamped together by means of screws 36. The upper half of the drive pulley 30 has projections 37 alternating with valleys 38 in an annular rim portion facing the dividing plane 35, with the projections and valleys forming a circumferential wave pattern. The projections 37 and the valleys 38 follow smoothly upon each other but in other respects the annular rim portion has the feature of a gear-ring. The lower half 34 of the drive pulley is designed in an analogous manner but is rotated through an angle relative to the upper half corresponding to a half wave length, so that valleys and projections in the two halves will lie opposite each other. In this way a circumferential groove 39 with wave formed upper and lower side surfaces is formed between the two halves. This groove 39 has a thickness which substantially corresponds to the thickness of the rubber rim portion 14 of the saw blade. Possibly, the groove 39 may be somewhat narrower than the rim portion 14.

Figure 6:
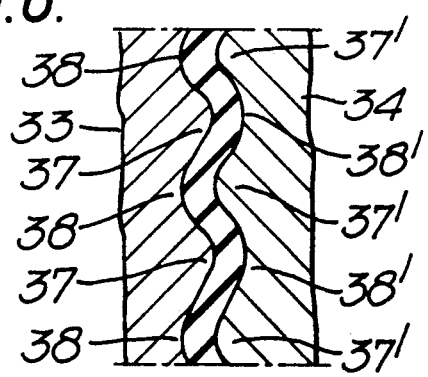
FIG. 6 is a section VI—VI in FIG. 5 through the drive pulley and a saw blade in the grip region between the drive pulley and the saw blade.

The rubber rim portion 14 is provided in the groove 39 such that it will extend along a sector of the rim portion. In this way, the peripheral part of the rim portion 14 will be bent in a wave pattern between on one side the projection 37 and the valleys 38 in the first half 33, and on the other side the corresponding valleys, and projections 38', 37', respectively, in the second half 34. This is schematically illustrated in FIG. 6. In this mode there is achieved a very efficient coupling between the drive pulley 30 and the saw blade 8 without any greater pressure having to be applied to the rim portion 14 of the saw blade. As a result, the friction losses in driving the saw blade are very small. As a result, the friction losses in driving the saw blade are very small. As the side 45 of the groove 24 in the saw blade 8 will gradually be worn, so that the groove 24 will widen, the saw blade to a corresponding degree will move outwards from the drive pulley 30. The grip in the wave pattern in the groove 39, however, during the entire life of operation of the saw blade will be sufficient to ensure a good grip between the drive pulley 30 and the rubber rim portion 14 of saw blade 8. Thus there is maintained a grip which resembles that of the grip in a gear-wheel or gear-ring transmission, regardless of changes of the positions of the drive pulley 30 and the saw blade 8 relative to each other. In this way, the favourable features of a gear-wheel transmission, namely good grip and low friction losses, are combined with reliability in operation of the friction drive.

In FIG. 7 there is shown a saw blade 8A having a somewhat different design. Thus the web portion 16A of this saw blade in its inner rim portion has a symmetrically projecting tongue 23A with smooth sides. The tongue 23A on both sides is covered by rubber layers 14A. The rubber layers 14A and the tongue 23A together have the same thickness as the web portion 16A.

Figure 8:
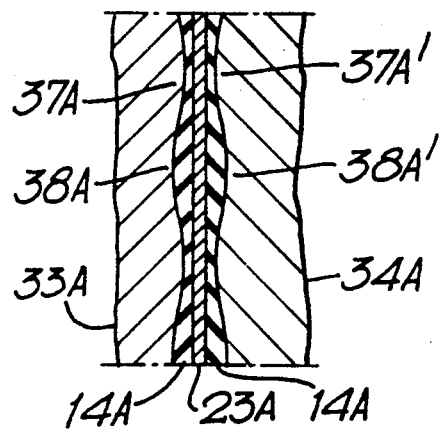
FIG. 8 is a section through the drive pulley and the saw blade in the grip region in the same view as in FIG. 6, the saw blade being the saw blade according to FIG. 7.

The rubber layers 14A on the saw blade 8A according to FIG. 7 can be used as drive surfaces in a groove in a drive pulley having a somewhat different design as compared to the previous embodiment. FIG. 8 schematically illustrates this embodiment of the groove in the drive pulley, the upper and lower parts of which have been designated 33A and 34A. The projections 37A and valleys 38A in the one half 33A in this case are located opposite to corresponding projections 37A' and valleys 38A', respectively, in the other half 34A of the drive pulley. In this way the layers 14A are alternately compressed and expanded, respectively through displacements of rubber at the passage through the groove. Also in this case there is achieved a very good grip between the drive pulley and the saw blade. The dimensions have been exaggerated in FIG. 8, as in FIG. 6, in order to make the mode of the operation clearer.

Still another embodiment of the projections of the drive pulley is shown in FIG. 9, which schematically illustrates one half of a drive pulley. The projections in this case consist of spherical segments 37B. The corresponding spherical segments in the other half of the drive pulley can be located between the spherical segments 37B shown in FIG. 9 (in this case there can be used, for example, a saw blade according to FIG. 3) or opposite to the spherical segments 37B (in this case there can be used, for example, a saw blade according to FIG. 7).

In the embodiment according to FIG. 11, a rubber layer 14C is provided in a groove 19 in the web portion 16C of the saw blade 8C. The inner rim portion 20C is somewhat bevelled.

Figure 12:
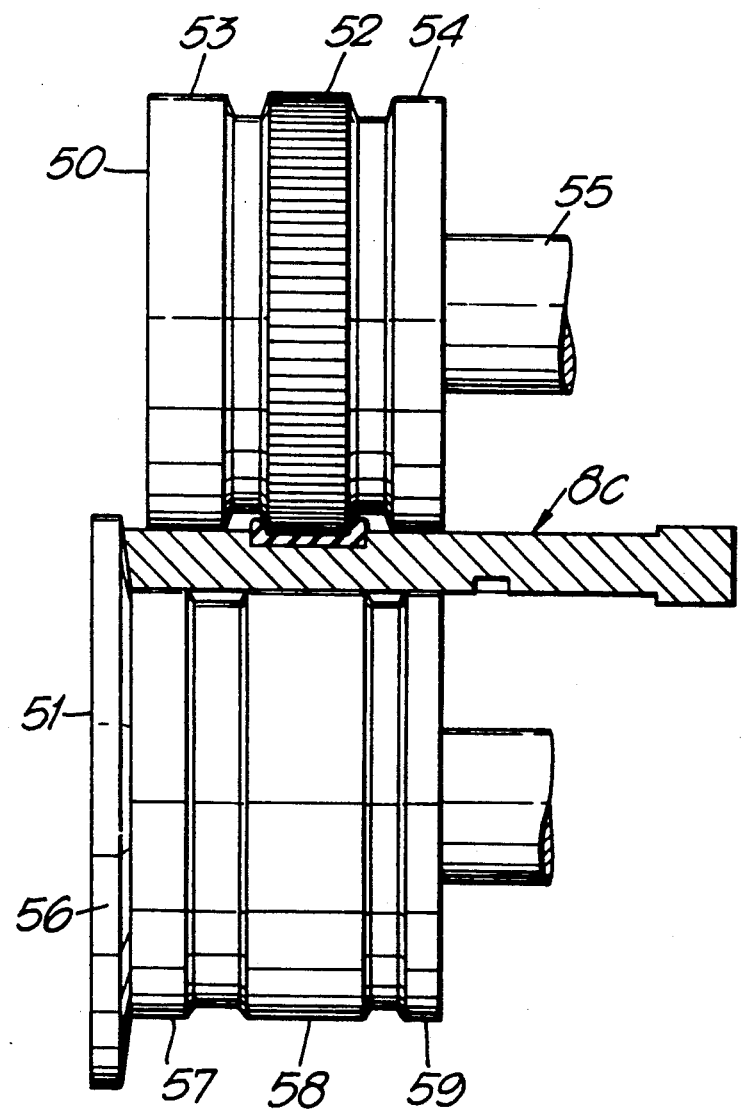
FIG. 12 illustrates, partly schematically, the driving of the annular saw blade according to FIG. 11.

For driving the saw blade 8C there can be used a machine of the type shown in FIGS. 10 and 12. The drive pulley 30, according to the previous embodiments, in this case has been replaced by a drive roller 50, which operates between a pair of upper running rollers, which are designed in the same way as the running rollers 42 and 43 according to FIG. 4. On the other side of the saw blade, opposite to the drive roller 50 there is a support roller 51, and opposite to the upper running rollers there may be provided a pair of lower running rollers, corresponding to the running rollers 40 and 41 according to FIG. 4. The latter ones, in this case are provided with a flange operating in the groove 24.

The drive roller 50 is provided with a drive axle 55 and has a central portion 52 having cogs, ridges, or other projections alternating with valleys, grooves or similar indentations, which projections may be pressed into the rubber layer 14C in order to give a good grip between the drive wheel 50 and the saw blade 8C. On both sides of the driving portion 52 there are support surfaces 53 and 54 having a smaller diameter, which support surfaces are pressed against the web portion 16C of the saw blade 8C and limitat the penetration of the projections of the drive portion 52 into the rubber layer 14C. The support roller 51 is provided with a flange 56 having a bevelled rotational surface which contacts and supports against the outer edge 20C of saw blade 8C in known manner. Rotational surfaces 57, 58 and 59 are provided which contact the underside of saw blade 8C.

In the above embodiment, the drive pulleys or drive rollers are provided with projections intended to be pressed into the flexible material of the saw blade. Experiments, however, have shown that one can achieve a very good drive also without such projections. This at least concerns an annular saw blade of the type where the flexible material has been located to the inner rim portion of the saw blade, as shown in FIG. 3. An annular saw blade of this type has been proven to work very efficiently together with a drive pulley having a wedge shaped groove with completely smooth sides. At the same time an annular saw blade of this type have given rise to considerably less noise than an annular saw blade without any rim portion of rubber. The invention therefore is not limited to be use of drive means, in the form of drive pulleys or drive rollers provided with projections as shown in the above-described embodiments.

I claim:

1. Annular saw blade comprising an outer periphery provided with cutting or tearing members (15), an inner periphery, and an annular web portion (16) between said inner and outer peripheries, characterized in that the saw blade (8) is provided with at least one annular drive surface of a flexible, polymeric, solid material (14), and that a rotatable drive member (30) can be pressed against said annular drive surface to effect rotation of the saw blade about its center of rotation.

2. Saw blade according to claim 1, characterized in that said flexible, polymeric material forms an inner rim portion (14) of the saw blade.

3. Saw blade according to claim 1, characterized in that said flexible, polymeric material forms at least one layer (14C) in a web portion region (16C) of the saw blade.

4. Saw blade according to claim 1, characterized in that said flexible, polymeric material consists of a layer (14A) on at least one side of an inner rim portion (23A) of the saw blade.

5. Annular saw for a saw blade according to claim 1, characterized in that said saw comprises rotating drive members (30, 50) provided with projections (37, 52) which can be pressed into said flexible material of the saw blade.

6. Annular saw according to claim 5, characterized in that said projections are provided in a groove (39) of a drive pulley, and that a rim portion (14) of the saw blade comprising said flexible material is receivable in said groove.

7. Annular saw according to claim 5, characterized by a drive wheel (50) with projections (52) which can be pressed into a layer (14C) in a web portion region (16C) of the saw blade.

* * * * *